United States Patent [19]

Takemae et al.

[11] Patent Number: 4,564,281
[45] Date of Patent: Jan. 14, 1986

[54] SIGNAL SELECTOR FOR AUTOMATIC EXPOSURE APPARATUS OF CAMERA

[75] Inventors: Mikio Takemae, Yokohama; Sakuji Watanabe, Warabi; Yuji Okubo, Omiya, all of Japan

[73] Assignee: Nippon Kogaku K.K., Tokyo, Japan

[21] Appl. No.: 671,024

[22] Filed: Nov. 14, 1984

Related U.S. Application Data

[63] Continuation of Ser. No. 481,742, Apr. 4, 1983, abandoned.

[30] Foreign Application Priority Data

Apr. 9, 1982 [JP] Japan ................................. 57-59177

[51] Int. Cl.[4] ...................... G03B 7/087; G03B 17/18; H03K 5/22
[52] U.S. Cl. .................................. 354/442; 354/465; 307/357
[58] Field of Search .................. 354/432, 441–445, 354/465, 469, 471, 473–475; 307/355, 356, 357, 359; 328/137, 147

[56] References Cited

U.S. PATENT DOCUMENTS 4,204,755  5/1980  Toyoda et al. ...................... 354/443
4,214,826  7/1980  Uchida et al. ...................... 354/432

Primary Examiner—William B. Perkey
Attorney, Agent, or Firm—Fitzpatrick, Cella, Harper & Scinto

[57] ABSTRACT

A camera includes an exposing device for exposing a photosensitive member with light from an object through an aperture, a detecting device for detecting an object brightness, a controlling device for controlling the exposing device and the aperture so as to obtain a proper exposure of the photosensitive member, a first signal producing device for producing a first signal, a second signal producing device for producing a second signal, a third signal producing device for producing a third signal, and a signal selecting device for selecting one of the first, second and third signals. The controlling device sets an aperture diameter and an exposure time to have a first, second or third relation in accordance with the first, second or third signal when the signal selecting device selects the first, second or third signal, in the order named.

3 Claims, 6 Drawing Figures

SIGNAL SELECTOR FOR AUTOMATIC EXPOSURE APPARATUS OF CAMERA

This application is a continuation of application Ser. No. 481,742, filed Apr. 4, 1983, now abandoned.

BACKGROUND OF THE INVENTION

1. Field of the Invention

The present invention relates to a signal selector and, more particularly, to a signal selector suitable for a programmed exposure control apparatus (automatic exposure apparatus) of a camera.

2. Description of the Prior Art

Conventionally, an automatic exposure apparatus is proposed to automatically control a shutter speed (a time value by an APEX notation). According to this apparatus, a stop value (an aperture value by the APEX notation) is automatically set in accordance with object brightness (a luminance value by the APEX notation) and a shutter speed preset by object brightness or external manual operation, and the stop value and the object brightness are used to determine whether or not the preset shutter speed is properly determined to obtain a proper exposure. If not, the preset shutter speed is automatically changed by the automatic exposure apparatus so as to obtain a proper shutter speed. More specifically, according to this apparatus, if a proper exposure cannot be obtained even if full-aperture metering is performed or a minimum aperture diameter is obtained corresponding to the preset stop value, the preset shutter speed is automatically corrected to obtain a proper exposure.

The above-mentioned apparatus may be effectively used in either a programmed automatic exposure apparatus or a shutter-priority automatic exposure apparatus. An indicator unit for the automatic exposure apparatus is disclosed in U.S. Pat. No. 4,204,755 wherein a shutter speed is automatically controlled with respect to a minimum stop value and a maximum stop value and an intermediate stop value therebetween.

In the indicator unit described above, however, automatic selector means for selecting a shutter speed comprises a comparator, an analog switch, a logic circuit and the like. Therefore, the number of circuit elements is greatly increased. Since there is a tendency these days to use electronic techniques to achieve a variety of camera functions, it is inevitable that the number of circuit elements of the automatic selector means should increase in the case of arranging an electronic circuit on an IC.

In general, in the process for manufacturing an IC, a simple comparator or a simple analog switch (follower amplifier) requires at least 10 transistors. A logic circuit requires two transistors for each gate. Furthermore, the follower amplifier used as the analog switch requires a capacitor for preventing spurious oscillation. A large area is used for a p-n junction of the diode so as to obtain a sufficient capacitance. For example, the area of the p-n junction corresponds to that of the follower amplifier. For these reasons, a conventional automatic selector means requires about 60 transistors and three capacitors, resulting in a large size IC. This drawback also occurs when an automatic selector means is constituted by discrete electronic elements.

SUMMARY OF THE INVENTION

It is, therefore, an object of the present invention to provide a signal selector means for selecting an input signal, which has a small number of circuit elements, so that the signal selector means may be suitably used for a camera.

In order to achieve the above object of the present invention, there is provided a signal selector comprising: a first signal line which receives an analog input signal (e.g., voltage VB to be described later); a second signal line which receives an upper limit signal (voltage VA to be described later) of the analog input signal; a third signal line which receives a lower limit signal (voltage VC to be described later) of the analog input signal; a first differential stage (transistors Q7 and Q8 to be described later) for generating an output signal in accordance with a difference between the analog input signal and the lower limit signal; a second differential stage (transistors Q1 and Q5 to be described later) for generating an output signal in accordance with a difference between the upper limit signal and the output signal from said first differential stage; an output signal line (transistors Q10 and Q11 and an end Pout to be described later); and a differential amplifier (transistors Q1 to Q5 and Q9) having the second differential stage as one input stage and having a negative feedback loop between the other input stage and the output signal line, whereby one of the lower and upper limit signals and the analog input signal is selectively produced at the output signal line in accordance with a level of the analog input signal.

It should be noted that, since a slight offset of the signals at the time of their selection can be neglected in controlling or driving a load by the selected one of the signals, the occurrence of such an offset may not depart from the spirit and scope of the present invention.

DETAILED DESCRIPTION OF THE PREFERRED EMBODIMENT

In order to best understand the present invention, an automatic exposure control apparatus having a programmed automatic exposure (AE) function and a shutter-priority AE function is described, since a signal selector of the present invention is applied to such an automatic exposure control apparatus.

There are two program systems for single-lens reflex cameras which have interchangeable lenses in accordance with the processing method of a difference between the minimum and maximum stop values. Assume that a lens having a minimum stop value of F1.4 and a maximum stop value of F16 is referred to as a lens A, and that another lens having a minimum stop value of F4 and a maximum stop value of F32 is referred to as a lens B. The two programs are respectively shown in FIGS. 1A and 1B, and each program is applied to the lenses A and B. Each of the graphs in FIGS. 1A and 1B is divided into three portions: an x portion in which only a shutter speed (a time value Tv) is changed in accordance with an increase in an exposure value Ev while the stop value (an aperture value Av) is kept at the minimum stop value; a y portion in which both the stop value and the shutter speed are changed in accordance with the increase in the exposure value Ev; and a z portion in which only the shutter speed is changed in accordance with the increase in the exposure value Ev while the stop value is kept at the maximum stop value.

Figure 1A:
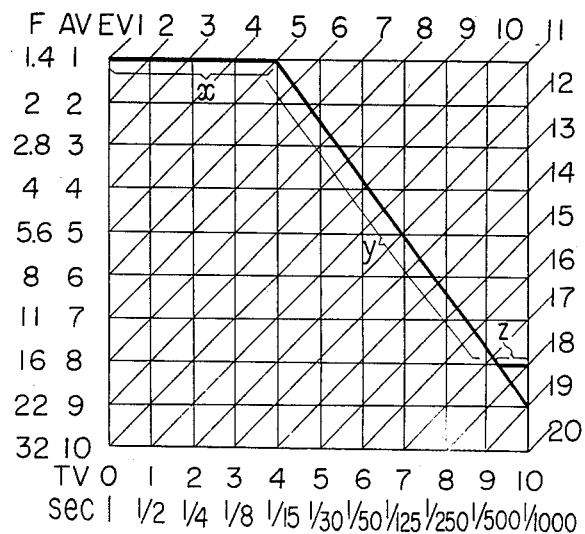
FIGS. 1A and 1B are graphs showing the programmed characteristics of an exposure control apparatus.
Figure 1B:
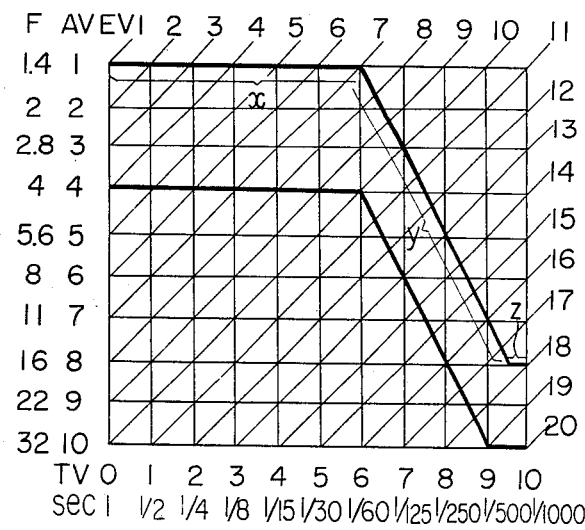

According to the system shown in FIG. 1A, the y portions of the programs for the two lenses A and B are the same. However, according to the system shown in FIG. 1B, the y portion for the lens A is displaced from that for the lens B to be parallel thereto. The relations defining the y portions for the lenses A and B are established as follows. For illustrative convenience, an APEX notation (Av, Tv, Ev, Bv and Sv) is used. The Bv is a luminance value and the Sv is an ASA speed value. The y portions in FIG. 1A are given by the following equation:

$$Tv = 0.75Av + 3.25 \quad (1)$$
$$= 0.75(Av - Av0) + 0.75Av0 + 3.25$$

where Av0 is the Av of the minimum stop value.

The y portions in FIG. 1B are given by the following equation:

$$Tv = 0.5(Av - Av0) + 6 \quad (2)$$

According to equation (2), the general equation for the y portions can be obtained as follows:

$$Tv = \alpha(Av - Av0) + \beta Av0 + \gamma \quad (3)$$

where $\alpha$, $\beta$ and $\gamma$ are constants, and where $\beta = \alpha$ in the system shown in FIG. 1A and $\beta = 0$ in the system shown in FIG. 1B.

The variable of the stop value is defined as (Av−Av0) in place of Av for convenience, especially for a TTL exposure system.

The proper exposure of the APEX system is given as follows:

$$Av + Tv = Bv + Sv$$

Using the above equation, equation (3) can be rewritten as follows:

$$Tv = \alpha(Bv + Sv - Tv - Av0) + \beta Av0 + \gamma$$

$$Tv = (\alpha/(1+\alpha))(Bv + Sv - Av0) + (1/(1+\alpha))\cdot(\beta Av0 + \gamma) \quad (4)$$

Equation (4) is used to calculate a proper shutter speed corresponding to the y portions of the programs in FIGS. 1A and 1B with respect to the given object brightness, the film speed, and the stop value of the lens, so as to satisfy the proper exposure criteria.

The circuit arrangement of the automatic exposure control apparatus will be described with reference to FIG. 2.

Figure 2:
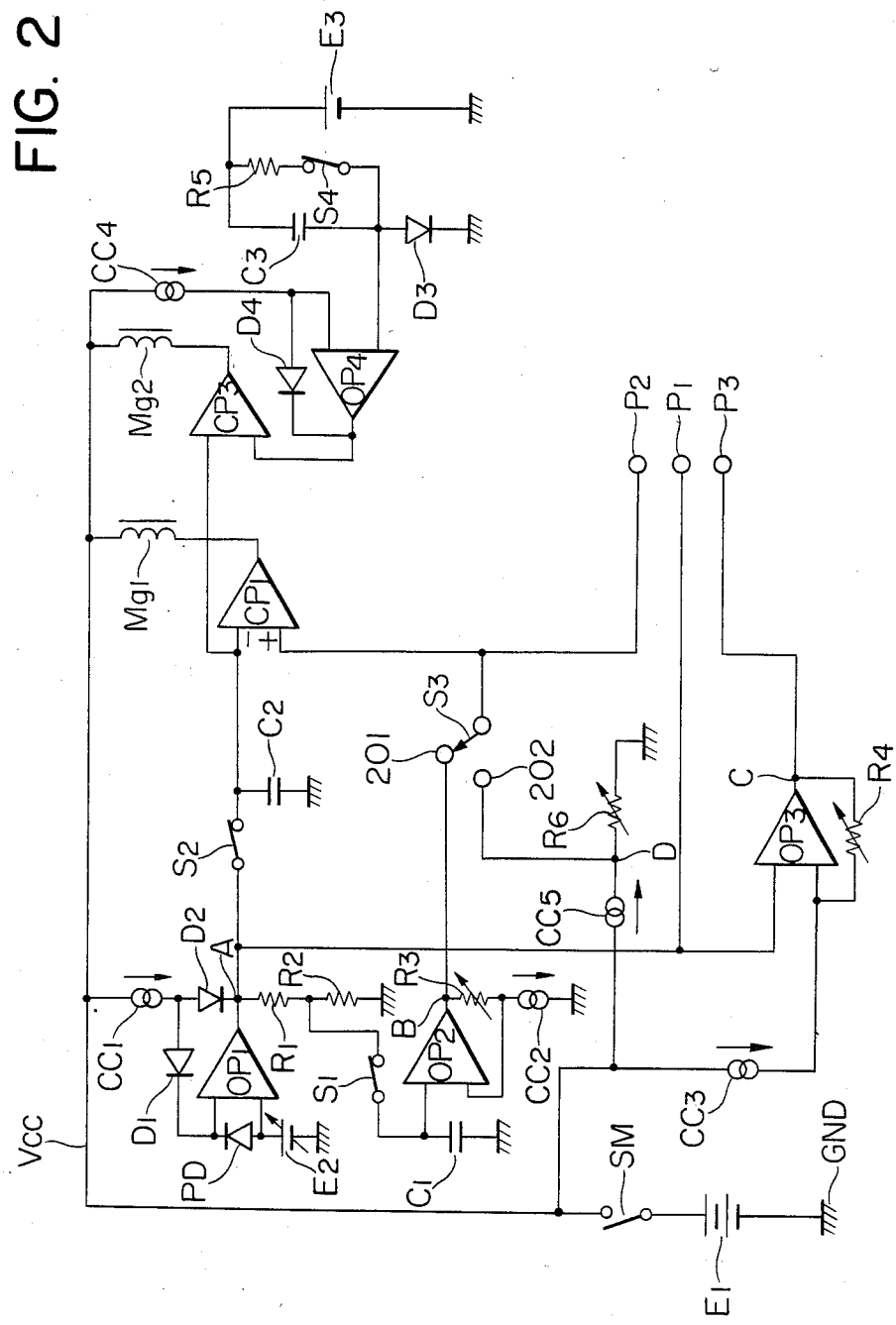
FIG. 2 is a circuit diagram of an automatic exposure control apparatus provided with a programmed automatic exposure (AE) mode and a shutter-priority AE mode.

Referring to FIG. 2, in the programmed AE mode, a switch S3 selects a contact 201 so as to obtain the maximum stop value (F16 for the lens A and F32 for the lens B). When the operator depresses a shutter release button to a level corresponding to a first step, a power switch $S_M$ is turned on, so that a current flows from a battery unit E1 to the circuit as a whole. A photodiode PD receives light passing through the lens and the aperture and generates a photoelectric signal corresponding to the intensity of the incident light. This photoelectric signal is subjected to logarithmic compression by means of an operational amplifier OP1 and a diode D1. A constant current source CC1 and a diode D2 are arranged to compensate for the temperature characteristics of the diode D1. In this condition, the stop value is kept at its minimum value. Therefore, light incident on the photodiode PD corresponds to light obtained by subtracting minimum stop value data from the light from the object. The logarithmic compressed data corresponds to (Bv−Av0) in the APEX system. A voltage corresponding to film speed data (the ASA speed value by the APEX notation) Sv is applied from a variable constant voltage generator E2 to the amplifier OP1. Therefore, a voltage VA at an output end A of the amplifier OP1 is given as follows:

$$VA = (Bv + Sv - AV0) \quad (5)$$

The voltage VA at the end A is divided by resistors R1 and R2. A ratio of the resistance of the resistor R1 to that of the resistor R2 is preset to be $\alpha:(1+\alpha)$. A voltage at the common node between the resistors R1 and R2 is given as $(\alpha/(1+\alpha))(Bv + Sv - Av0)$. This voltage is applied to an operational amplifier OP2 through a switch S1, and data $(1/(1+\alpha))(\beta Av0 + \gamma)$ is added to the voltage VA by a constant current source CC2 and a resistor R3. As a result, a voltage VB at an output end B of the amplifier OP2 is given as follows:

$$VB = (\alpha/(1+\alpha))(Bv + Sv - Av0) + (1/(1+\alpha))\cdot(\beta Av0 + \gamma) \quad (6)$$

The voltage VB corresponds to Tv given by equation (4). In the program shown in FIG. 1A, the resistor R3 must comprise a variable resistor whose resistance is changed in accordance with a stop value of the lens. However, in the program shown in FIG. 1B, the resistor R3 may comprise a fixed resistor corresponding to $\gamma$ since the condition $\beta = 0$ is given. The output voltage of the amplifier OP1, that is, the voltage at the end A, is applied to an input end of an operational amplifier OP3. Data ((Av)preset −Av0) in the APEX system is subtracted from the voltage from the amplifier OP1. This data corresponds to a value preset by a constant current source CC3 and a variable resistor R4 whose resistance is changed ganged with the lens aperture link mechanism. The preset value described above is preset in the lens aperture link mechanism. The aperture link mechanism is set corresponding to the maximum stop value (i.e., Avmin), so that a voltage at an output end C of the amplifier OP3 is given as follows:

$$VC = (Bv + Sv - Av0) - (Avmin - Av0) \quad (7)$$
$$= Bv + Sv - Avmin$$

When equations (5), (6) and (7) are compared with the rewritten equation (i.e., $Tv = Bv + Sv - Av$) of a proper exposure using the APEX notation, the following results are obtained. The voltage VA at the end A indicates the proper Tv value for proper exposure with respect to the minimum stop value, that is, the Tv value $(Tv)A$ of the x portion. The voltage VB at the end B indicates the Tv value $(Tv)B$ of the y portion. The voltage VC at the end C indicates the Tv value for proper exposure with respect to the maximum stop value, that is, the Tv value $(Tv)C$ of the z portion.

In the case of obtaining a proper Ev (exposure value), if $VB > VA$, then $(Tv)B > (Tv)A$. In this condition, the corresponding stop value is smaller than the minimum stop value according to the y portion. Therefore, in accordance with the x portion, the stop value is kept at the minimum stop value, and the shutter speed is corrected. For this purpose, the shutter speed must be indicated in accordance with the voltage VA. If $VA > VB > VC$, then the stop value and the shutter speed are controlled in accordance with the y portion. For this purpose, the shutter speed must be indicated in accordance with the voltage VB. If $VA > VC > VB$, then the corresponding stop value is greater than the maximum stop value in accordance with the y portion. The shutter speed is then controlled in accordance with the z portion. The shutter speed in this case must be indicated in accordance with the voltage VC.

As may be apparent from the above description, when exposure control is performed in accordance with the x portion, the voltage VA is applied to the indicator unit. When exposure control is performed in accordance with the y portion, the voltage VB is applied to the indicator unit. When exposure control is performed in accordance with the z portion, the voltage VC is applied to the indicator unit. Furthermore, if a shutter speed scale is disposed opposing an indicator pointer, the proper controlled shutter speed can always be indicated by the indicator unit.

This indicator unit is not limited to a meter, but may be extended to an arrangement in which a shutter speed scale is disposed opposing a light-emitting diode (LED) array to obtain the same effect as described above.

When the operator further depresses a shutter release button to a level corresponding to a second step, the lens aperture is closed. However, before this operation, the switch S1 is opened to apply the voltage at the common node of the resistors R1 and R2 to a capacitor C1 and the voltage VB is kept steady. As the aperture closes over time, the amount of light incident on the photodiode PD corresponds to the value obtained by subtracting from the amount of light of the object the actual stop value which is spontaneously changing. The output voltage VA from the amplifier OP1 is set to be $(Bv + Sv - AV)$, so that the proper Tv value which is changing as a function of time can be obtained so as to match the proper exposure conditions. The voltage VA is compared by a comparator CP1 with the voltage VB. If the voltage VA coincides with the voltage VB, the comparator CP1 produces a signal of high level. A current which has been flowing through an electromagnet Mg1 is interrupted, so that the stop value is kept at its present value. Subsequently, when a switch S2 is opened, the voltage VA is applied to a capacitor C2 which is then charged. The voltage VA is then supplied to one input end of a comparator CP3. Thereafter, when the camera mirror is pivoted upward, and this pivotal movement is completed, the shutter is released.

A trigger switch S4 is then opened simultaneously when the front curtain of the shutter starts moving. A logarithmic converter which comprises an operational amplifier OP4, a constant voltage generator E3, a capacitor C3, diodes D3 and D4, a resistor R5, and a constant current source CC4, starts operation. The logarithmic converter produces a voltage corresponding to the Tv value of the exposure time after the front curtain of the shutter starts moving. When the Tv value corresponds to the voltage VA to which the capacitor is charged, the comparator CP3 is started. An electromagnet Mg2 is deenergized, so that the rear curtain starts moving.

When the switch S3 selects a contact 202, the shutter-priority AE mode is set. In this mode, a voltage VD is produced at an output end D by a constant current source CC5 and a resistor R6 whose resistance is changed interlocked with an shutter speed setting. The output voltage VD corresponds to the Tv value $(Tv)m$ which is obtained by manual operation. The voltage VD is applied to the comparator CP1. Thus, the voltage VB is switched to the voltage VD.

If $VD > VA > VC$ when the operator depresses the shutter release button to the level corresponding to the first step, the corresponding stop value must be smaller than the minimum stop value. Therefore, the stop value is kept at the minimum stop value, and the shutter speed is changed from the value $(Tv)m$ to the value $(TV)A$ which gives the proper exposure with respect to the minimum stop value. The shutter speed must be indicated in accordance with the voltage VA. On the other hand, if $VA > VD > VC$, the stop value falls within a range between the minimum and maximum stop values. Therefore, the shutter speed is controlled to be $(Tv)m$ and is indicated in accordance with the voltage VD.

If $VA > VC > VD$, the corresponding stop value must be greater than the maximum stop value. However, this cannot be performed, so that the shutter speed must be corrected. In this case, the shutter speed must be indicated in accordance with the voltage VC.

When the operator further depresses the shutter button, the exposure time is controlled in the manner as previously mentioned.

As may be apparent from the above description, even in the shutter-priority AE mode, the actual controlled shutter speed can be indicated in accordance with the voltages VA, VC and VD.

Figure 3:
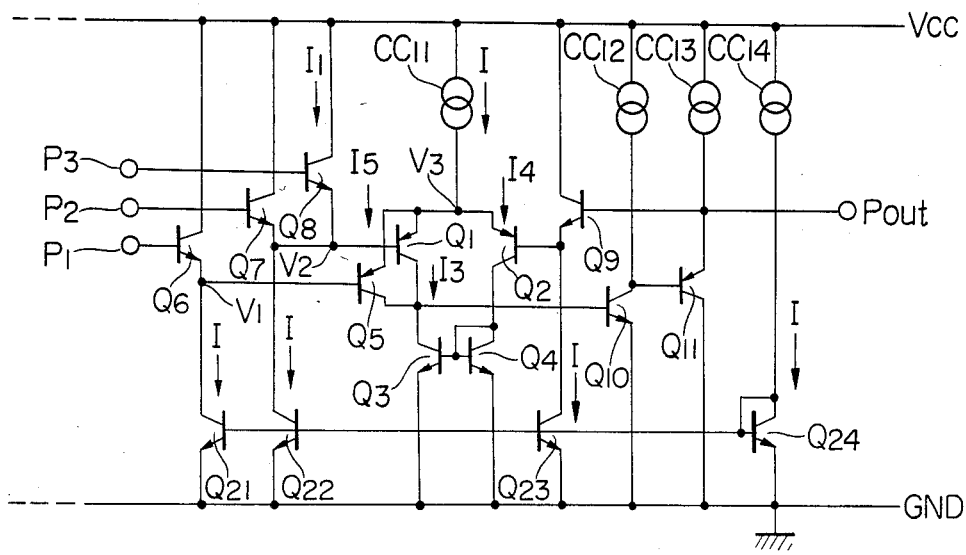
FIG. 3 is a circuit diagram of a signal selector according to an embodiment of the present invention.

FIG. 3 is a circuit diagram of a signal selector according to an embodiment of the present invention.

A power source voltage is applied between lines Vcc and GND. A constant current source CC11 and transistors Q1 to Q4 constitute a differential amplifier. The transistors Q3 and Q4 constitute a current mirror circuit. A transistor Q5 is connected to be parallel with the transistor Q1. Transistors Q6 and Q21 are connected in series with each other. The emitter of the transistor Q6 is connected to the base of the transistor Q5. An input end P1 is connected to the base of the transistor Q6. Transistors Q7 and Q22 are connected in series with each other. The emitter of the transistor Q7 is connected to the base of the transistor Q1. An input end P2 is connected to the base of the transistor Q7. A transistor Q8 is connected to be parallel with the transistor Q7. An input end P3 is connected to the base of the transistor Q8. The transistors Q9 and Q23 are connected in series with each other. The emitter of the transistor Q9 is connected to the base of the transistor Q2. A transistor Q10 having its base connected to the collectors of the transistors Q1 and Q5 is connected to a constant current source CC12. A constant current source CC13 and a transistor Q11 are connected in series with each other. The base of the transistor Q11 is connected to the collector of the transistor Q10. The common node among the base of the transistor Q9, the emitter of the transistor Q11 and the constant current source C13 is connected to an output end Pout. A constant current source CC14 supplies a constant current I to a transistor Q24. The transistors Q21 to Q24 constitute a current mirror circuit. The collector currents of the transistors Q21 to Q23 are predetermined to be equal to a collector current I of the transistor Q24.

The collector current of the transistor Q8 is defined as I1, and the emitter currents of the transistors Q1, Q2 and Q5 are defined as I3, I4 and I5, respectively. An output current from the constant current source CC11 is defined as I. The base voltage of the transistor Q5 is defined as V1, the base voltage of the transistor Q1 is defined as V2 and the common emitter voltage of the transistors Q1, Q2 and Q5 is defined as V3.

The voltages VA, VB and VC at the ends A, B and C shown in FIG. 2 are applied to the input ends P1, P2 and P3, respectively.

It should be noted that a negative feedback loop is formed between the output end Pout and the base of the transistor Q9. It should also be noted that the transistors Q7 and Q8 which respectively receive voltages from the input ends P2 and P3 constitute a differential stage (first differential stage), and that the transistors Q1 and Q5 which receive the common emitter voltage from the transistors Q7 and Q8 and the emitter voltage from the transistor Q6 also constitute a differential stage (second differential stage).

Operation of the signal selector according to the embodiment of the present invention will be described hereinafter. The base voltage of the transistor Q5 (i.e., the emitter voltage V1 of the transistor Q6), the base voltage of the transistor Q1 (i.e., the common emitter voltage V2 of the transistors Q7 and Q8), the common emitter voltage V3 of the transistors Q1, Q2 and Q5, and an output voltage Vout at the output end Pout are given as follows:

$$V1 = VA - h \cdot \ln(I/Is) \tag{8}$$

$$V1 = VA - h \cdot \ln(I/Is) \tag{8}$$

$$\begin{aligned} V2 &= VC - h \cdot \ln(I1/Is) \\ &= VB - h \cdot \ln((I - I1)/Is) \end{aligned} \tag{9}$$

$$\begin{aligned} V3 &= V1 + h \cdot \ln(I5/Is) \\ &= V2 + h \cdot \ln(I3/Is) \end{aligned} \tag{10}$$

$$Vout = V3 - h \cdot \ln(I4/Is) + h \cdot \ln(I/Is) \tag{11}$$

$$Vout = V3 - h \cdot \ln(I4/Is) + h \cdot \ln(I/Is) \tag{11}$$

where h is a ratio (KT/q) of a product of the Boltzmann constant (K) and the absolute temperature (T) to the charge q of the electrons, and Is is a reverse saturation current of the diode. According to the operation of the current of the mirror circuit which has the transistors Q3 and Q4, the following equation is established:

$$I4 = I3 + I5 \tag{12}$$

Therefore, $$I = 2I4 = I3 + I4 + I5 \tag{13}$$

When the object brightness is low (and the EV value is also low) and the voltage VB is close to the voltage VA (and the voltage VC is significantly lower than the voltages VA and VB), it is assumed that the transistor Q8 is kept OFF. In other words, the condition I1=0 is established. Therefore, the voltage V3 is given in accordance with equations (8), (9) and (10):

$$\begin{aligned} V3 &= VA - h \cdot \ln(I/Is) + h \cdot \ln(I5/Is) \\ &= VB - h \cdot \ln(I/Is) + h \cdot \ln(I3/Is) \end{aligned} \tag{14}$$

The output voltage Vout can be given in accordance with equations (11) and (14) as follows:

$$Vout = VA - h \cdot \ln(1 + \exp((VA - VB)/h)) \tag{15}$$

The output voltage Vout can be changed in accordance with the relationship between (VA−VB) and h as follows:

If $VA - VB \gg h$, then $Vout \approx VB$;
If $VB - VA \gg h$, then $Vout \approx VA$, and
If $VA = VB$, then $Vout = VA - h \cdot \ln 2 = VB - h \cdot \ln 2$.

When the object brightness is very low and the stop value is controlled in accordance with the x portion, (i.e., $VB - VA \gg h$) the voltage VA appears at the output end Pout. If the object brightness is normal and the stop value is controlled in accordance with the y portion, (i.e., $VA - VB \gg h$) the voltage VB appears at the output end Pout. The output end Pout is connected to the indicator unit for indicating the shutter speed. When the object brightness is controlled during a transition from the x portion to the y portion, the output voltage Pout is continuously changed from the voltage VA to the voltage VB according to the voltage h·ln2 as the maximum offset voltage. In other words, the x portion is continuous with the y portion, without any discontinuity therebetween.

When the object brightness is very high (and the EV value is also high) and the voltage VB is closer to the voltage VC (and the voltage VA is significantly higher than the voltages VB and VC), the transistor Q5 is kept OFF. It is therefore assumed that the condition I5=0 is established. The voltage V3 is then given in accordance with equations (9) and (10) as follows:

$$\begin{aligned} V3 &= VB - h \cdot \ln(I - I1)/Is + h \cdot \ln(I4/Is) \\ &= VC - h \cdot \ln(I1/Is) + h \cdot \ln(I4/Is) \end{aligned} \tag{16}$$

The output voltage Vout is then given in accordance with equations (4) and (9) as follows:

$$Vout = VC + h \cdot \ln(1 + \exp((VB - VC)/h)) \tag{17}$$

The output voltage Vout changes in accordance with the relationship between (VB−VC) and h as follows:
If $VB - VC \gg h$, then $Vout \approx VB$;
If $VC - VB \gg h$, then $Vout \approx VC$; and
If $VB = VC$, then $Vout = VC + h \cdot \ln 2 = VB + h \cdot \ln 2$.

When the object brightness is very high and the stop value is controlled to be the maximum stop value in accordance with the z portion, (i.e., $VC - VB \gg h$) the voltage VC appears at the output end Pout. However, when the object brightness is changed to be considerably low, the stop value is determined in accordance with the y portion and is controlled to fall between the minimum and maximum stop values. Therefore, since (VB−VC>>h) the voltage VB appears at the output end Pout. On the other hand, when the object brightness falls within a range controlled during a transition from the z portion to the y portion, the output voltage Vout nonlinearly changes from the voltage VC to the voltage VB according to the voltage h·ln2 as the maximum offset voltage. In other words, the z portion is continuous with the y portion, without any discontinuity therebetween.

Figure 4:
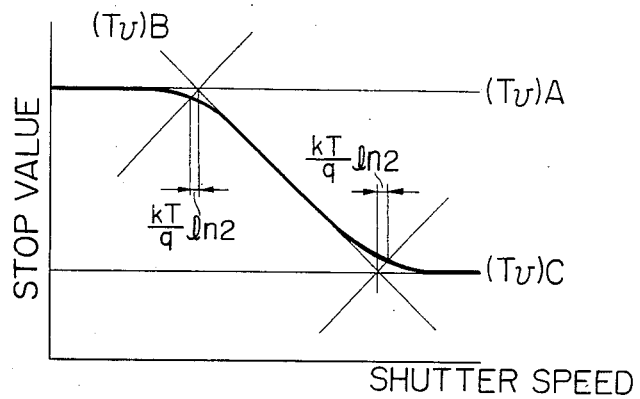
FIGS. 4 and 5, respectively, are graphs for explaining the stop value as a function of the shutter speed, using the output voltage as a parameter, in the signal selector shown in FIG. 3.
Figure 5:
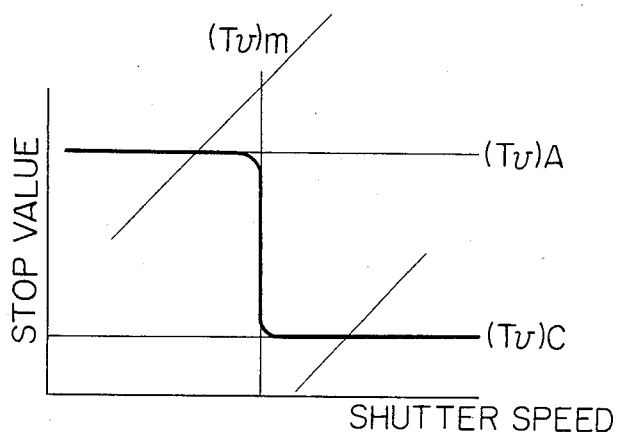

As described above, the program diagram can be obtained as shown in FIG. 4 wherein the voltages VA, VB and VC can be selected as required. The voltage h·ln2 can be illustrated by a program diagram in which a combination of the shutter speed and the stop value is deviated by about Ev/2 with respect to the program diagrams shown in FIGS. 1A and 1B. The program diagram shown in FIG. 4 indicates that an exposure error and an indicator error are excluded. Similarly, in the shutter-priority AE mode, the graph shown in FIG. 5 is obtained. The voltage Vout at the output end Pout is strictly given by the following equation:

$$V_{out} = VA + h \cdot \ln\left[\cfrac{1}{1 + \exp\cfrac{VA - VB + h \cdot \ln\left(\cfrac{\exp\frac{VB - VC}{h}}{1 + \exp\frac{VB - VC}{h}}\right)}{h}}\right] \quad (18)$$

In equation (18), the ON/OFF operation of the transistors Q5 and Q8 is performed in accordance with comparisons among the voltages VA, VB and VC, thereby eliminating the voltage VA or VB so as to obtain the same effect as described above. In the first differential stage of the transistors Q7 and Q8 and the second differential stage of the transistors Q1 and Q5, inputs may be Darlingtonconnected. In other words, if the number of electronic elements at the transistor input stage is increased but not greatly so that IC chip area is not influenced.

Furthermore, if a device for producing the signals at the ends P1, P2 and P3 produces voltages VA, VB, VC and VD in accordance with the object brightness, exposure control may be performed in accordance with the output at the output end Pout.

We claim:

1. A device for generating an analog signal in accordance with first, second and third analog signals, including:
   (a) first producing means for producing a fourth analog signal in accordance with a difference between levels of said first and second analog signals, a level of said fourth analog signal being substantially equal to a higher level out of said first and second analog signals, said first producing means including two bipolar transistors, a base of one of said two bipolar transistors receiving said first analog signal, and a base of the other of said two bipolar transistors receiving said second analog signal, collectors of said two bipolar transistors being connected to each other, and emitters of said two bipolar transistors being connected to each other; and
   (b) second producing means for producing a fifth analog signal inaccordance with a difference between levels of said third and fourth analog signals, a level of said fifth analog signal being substantially equal to a lower level out of said third and fourth analog signals, said second producing means including two bipolar transistors, a base of one of said two bipolar transistors receiving said fourth analog signal, a base of the other of said two bipolar transistors receiving said third analog signal, collectors of said two bipolar transistors being connected to each other, and emitters of said two bipolar transistors being connected to each other.

2. A device according to claim 1, wherein said second producing means includes an output line and a differential amplifier said differential amplifier including another bipolar transistor, said two bipolar transistors of said second producing means and sand another bipolar transistor constituting a differential pair of said differential amplifier, and a negative feedback loop being formed between said another bipolar transistor and said output line.

3. A camera including exposing means for exposing photosensitive means with light from an object to be photographed through an aperture, including:
   (a) detecting means for detecting an object brightness;
   (b) controlling means for controlling said exposing means and said aperture so as to obtain a proper exposure of said photosensitive means, said aperture controlling means being adapted to set an aperture diameter and an exposure time to have one of first, second and third relations within three different ranges of object brightness;
   (c) first signal producing means for producing a first analog signal so that said controlling means sets the aperture diameter and the exposure time to have the first relation in accordance with said first analog signal;
   (d) second signal producing means for producing a second analog signal so that said controlling means sets the aperture diameter and the exposure time to have the second relation in accordance with said second analog signal;
   (e) third signal producing means for producing a third analog signal so that said controlling means sets the aperture diameter and the exposure time to have the third relation in accordance with said third analog signal;
   (f) first producing means for producing a fourth analog signal in accordance with said second and third analog signals, a level of said fourth analog signal being substantially equal to a higher level out of said second and third analog signals; and
   (g) second producing means for producing a fifth analog signal in accordance with said first and fourth analog signals, a level of said fifth analog signal being substantially equal to a lower level out of said first and fourth analog signals, said second producing means including two bipolar transistors, a base of one of said two bipolar transistors receiving said first analog signal, a base of the other of said two bipolar transistors receiving said fourth analog signal, collectors of said two bipolar transistors being connected to each other, and emitters of said two bipolar transistors being connected to each other, said second producing means further including an output line and a differential amplifier, said differential amplifier including another bipolar transistor, said two bipolar transistor constituting a differential pair of said differential amplifier, and a negative feedback loop being formed between said another bipolar transistor and said output line.

* * * * *

UNITED STATES PATENT AND TRADEMARK OFFICE
CERTIFICATE OF CORRECTION

PATENT NO. : 4,564,281
DATED : January 14, 1986
INVENTOR(S) : MIKIO TAKEMAE, ET AL.

It is certified that error appears in the above-identified patent and that said Letters Patent is hereby corrected as shown below:

Column 4, line 1 of formula (6), delete "-" at end of line.

Column 7, line 45, delete "V1 = VA - h · ln(I/Is)   (8)";
   line 59, delete "Vout = V3 -h · ln(14/Is) + h· In(i/Is)   (11)".

Column 9, line 40, after "Q5" insert --transistor--.

Column 10, line 12, after "amplifier" (first occurrence) insert --,--.

Signed and Sealed this

Twenty-fifth Day of March 1986

[SEAL]

Attest:

DONALD J. QUIGG

Attesting Officer

Commissioner of Patents and Trademarks